United States Patent [19]

Minnear et al.

[11] 4,320,079
[45] Mar. 16, 1982

[54] METHOD FOR MAKING SHAPED CARBON FIBER STRUCTURES

[75] Inventors: William P. Minnear, Schenectady; William A. Morrison, Albany, both of N.Y.

[73] Assignee: General Electric Company, Schenectady, N.Y.

[21] Appl. No.: 138,538

[22] Filed: Apr. 9, 1980

[51] Int. Cl.³ .......................... B29G 7/00; B29C 5/00; C04B 35/70
[52] U.S. Cl. ..................................... 264/102; 249/62; 264/116; 264/221; 264/225; 264/257; 264/317; 264/DIG. 44; 425/85; 425/DIG. 12
[58] Field of Search ............... 264/102, 257, 116, 221, 264/225, 317, DIG. 44; 249/62; 425/85, DIG. 12

[56] References Cited

U.S. PATENT DOCUMENTS

| | | |
|---|---|---|
| 3,412,062 | 11/1968 | Johnson et al. |
| 3,669,920 | 6/1972 | Haggis et al. ................... 264/257 X |
| 3,675,294 | 7/1972 | Palfreyman et al. ............ 264/257 X |
| 3,817,819 | 6/1974 | Hoppe et al. .................... 264/257 X |
| 3,975,479 | 8/1976 | McClean ......................... 264/257 X |
| 4,072,738 | 2/1979 | Pierson et al. ....................... 264/102 |
| 4,124,670 | 11/1978 | Cecka et al. .................... 264/257 X |
| 4,141,948 | 2/1979 | Laskow et al. .................. 264/257 X |

FOREIGN PATENT DOCUMENTS

| | | | |
|---|---|---|---|
| 801182 | 9/1958 | United Kingdom ................ 264/102 |
| 1123166 | 8/1968 | United Kingdom ................ 264/102 |

Primary Examiner—Philip Anderson
Attorney, Agent, or Firm—William A. Teoli; James C. Davis, Jr.

[57] ABSTRACT

A method is provided for making shaped self-supporting carbon-fiber structure by initially forming a fluid mixture of curable binder and carbon-fiber. The mixture is poured into a mold, and a vacuum is applied to the mold to effect the separation of excess binder. Cure is effected of the residual binder to produce a removable self-supporting shaped carbon-fiber structure.

4 Claims, 2 Drawing Figures

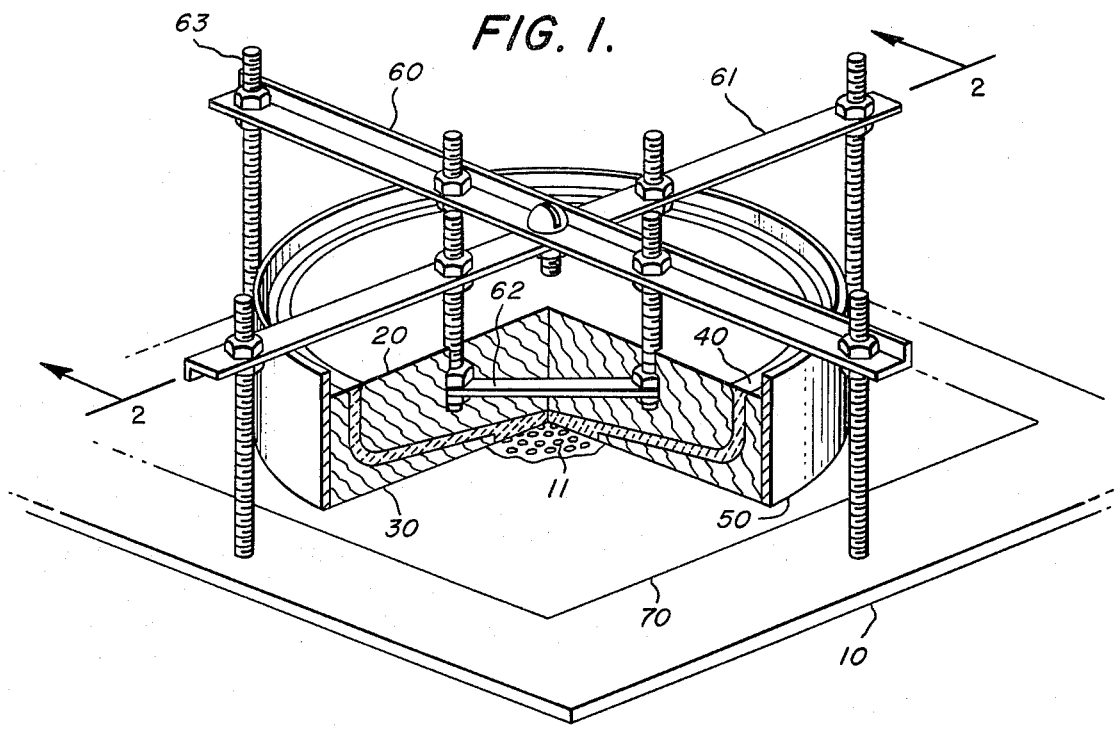
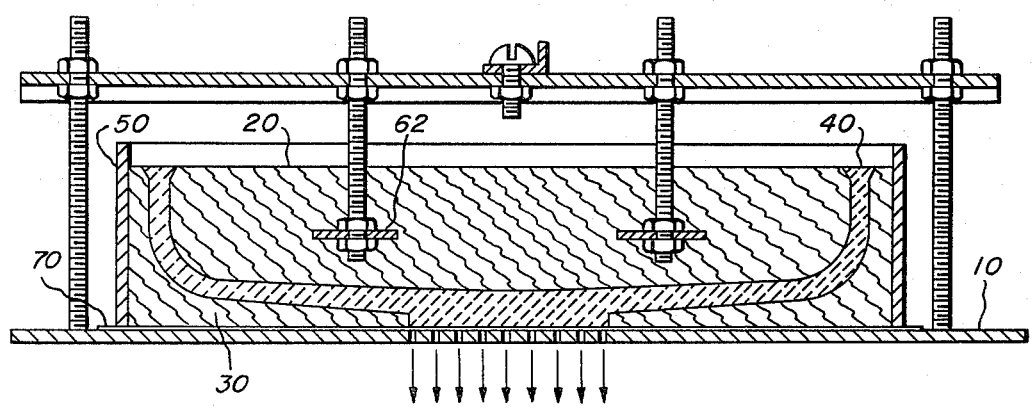

METHOD FOR MAKING SHAPED CARBON FIBER STRUCTURES

CROSS REFERENCE TO RELATED APPLICATION

Reference is made to copending application Ser. No. 138,610, filed 4-9-80, now abandoned, W. P. Minnear et al., Method for Purifying Silicon Powder and Method for Making Silicon-Silicon Carbide Composites Using Such Silicon Powder, filed concurrently herewith and assigned to the same assignee as the present invention.

BACKGROUND OF THE INVENTION

Prior to the present invention, self-supporting carbon fiber structures suitable for molten silicon infiltration to produce silicon-silicon carbide composites were generally made by machining a preform which could be made from carbon fiber or filaments and a suitable binder, such as molten wax or colloidal graphite, etc., as shown in Laskow et al, U.S. Pat. No. 4,141,948, assigned to the same assignee as the present invention. However, in view of the increased interest toward the use of silicon-silicon carbide refractories having intricate shapes without the need for machining with abrasives as provided by the aforementioned Laskow et al method, renewed interest has been applied to the development of procedures for making the molten silicon infiltratable carbon fiber preforms by techniques other than by machining.

The present invention is based on the discovery that shaped self-supporting carbon fiber structures can be made by a slurry casting procedure similar to slip casting based on the pouring of a curable mixture of carbon fiber and binder into a mold, followed by the removal of excess binder by the application of reduced pressure. The resulting carbon fiber having residual binder can be readily converted to a self-supporting shaped structure by allowing the binder to cure or by effecting its cure, such as by subjecting it to heat or radiation and thereafter providing for the removal of the shaped carbon fiber structure from the mold.

STATEMENT OF THE INVENTION

There is provided by the present invention, a method for making shaped carbon fiber structures suitable for molten silicon infiltration to produce silicon-silicon carbide composites which comprises
 (1) blending carbon fiber and a curable binder to produce a stable pourable suspension,
 (2) degassing the suspension of (1) by use of reduced pressure,
 (3) pouring the degassed suspension into a mold,
 (4) stripping the suspension in the mold of excess binder, and
 (5) allowing or effecting the cure of residual carbon fiber binder to produce a self-supporting shaped carbon fiber structure.

As used hereinafter, the term "carbon fiber" includes commercially available carbon fiber, for example, high strength graphite having a tensile psi of $10^5$ psi and a modulus of $2 \times 10^6$ psi and a carbonized density of 1.6 g/cc, as shown by Johnson et al., U.S. Pat. No. 3,412,062. Preferably, the carbon fiber used in the method of the present invention has a specific gravity of from about 1.4 to 1.7 and includes, for example, WYK braid, WYB tow of Union Carbide Corporation and other carbonized fibers derived from rayon or regenerated cellulose fibers, such as carbon felt. The term carbon fiber signifies a fiber or particle having an average diameter of about 5 to 100 microns and an aspect ratio of L/D of from 2 to 1000.

Binders which can be utilized in the practice of the method of the present invention are, for example, epoxy resins (Epon 828, a product of Shell Chemical Company), Krylon, a product of Borden Incorporated, alginates, guar gum, white glue, etc.

In order that those skilled in the art will be better able to appreciate the method of the present invention, reference is made to the drawings.

In FIG. 1, there is shown an upper sectional view of a mold;

in FIG. 2 there is shown a cross-sectional side view of a mold.

DETAILED DESCRIPTION OF THE DRAWING

More particularly, in FIG. 1 there is shown a mold on a supporting structure at 10 where the top of the mold is shown at 20 which is supported by a superstructure at 60 and 61 having supporting legs which are shown, for example by 63 and a cross-bar is shown at 62. The bottom section of the mold is shown at 30 and the cast self-supporting carbon fiber structure resulting from the pourable mixture and the stripping of excess binder is shown at 40. Filter paper is shown at 70 and a cutout section of the filter paper exposing the perforated iron section for effecting the removal of the excess binder is shown at 11.

In FIG. 2 a cross-section of the mold is further shown and in particular a detail of the stripping of the binder from the pourable mixture is illustrated.

In the practice of the present invention, a blend of carbon fiber and binder is thoroughly mixed to produce a stable suspension. The ingredients should be thoroughly stirred and used soon thereafter to minimize the settling of the carbon fiber in the blend to provide for a uniform distribution of the carbon fiber in the mold. Pouring of the castable blend can be performed under ambient conditions into the mold as long as the viscosity of the total mixture provides for ready transfer of the mixture into the mold cavity. As previously defined, depending upon the nature of the binder, effective amounts of curing catalyst can be utilized to provide for the cure of the binder after the casting and the stripping procedure has been completed.

Stripping of the excess binder from the resin can be achieved by use of a partial vacuum, such as 1 to 100 torr which can be achieved by applying the vacuum across the bottom of the mold, as shown in FIG. 2 utilizing a perforated supporting structure such as filter paper, and the like, to prevent the loss of carbon fiber while the resin is being removed. Prior to the casting of the pourable mixture, degassing of the suspension may be required, based on the amount of trapped air which can be introduced by the mixing of the ingredients.

Upon termination of the binder from the mold, the carbon fiber structure can be allowed to rest in the mold cavity to allow the binder to cure under ambient conditions.

In order that those skilled in the art will be better able to practice the invention the following examples are given by way of illustration and not by way of limitation. All parts are by weight.

EXAMPLE 1

A wax mold was made in accordance with FIG. 1 and FIG. 2. A glass pie plate was initially cast in paraffin wax by centering the glass plate on top of a flat plate. The glass plate was also surrounded by a circular containment wall which allowed sufficient space between the edge of the glass plate and the wall to pour molten wax. After the exterior wall of the glass plate was finished, it was removed leaving a negative image of the glass plate in wax. The exterior wall was centered over filter paper positioned over the opening in a perforated metal plate.

The top section of the mold cavity was cast by pouring wax into the glass plate which contained retaining bars projecting vertically into the glass plate from a super structure above, as shown in FIG. 1. After the wax solidified, the upper mold section was then removed from the glass plate and positioned over the lower mold section, as shown in the drawings.

A slurry of carbon fiber and epoxy resin was made by blending a mixture of crushed carbon fiber obtained by milling Union Carbide WDF felt and an equal parts by weight blend of Epon 828, a diglycidal ether of Bisphenol-A, and methylethyl ketone which contained 10% by weight of epoxy the blend of diethylenetriamine, a catalyst for the Epon 828. The crushed carbon fiber utilized at equal parts by weight of the aforementioned binder and had an average diameter of about 10 microns and an aspect ratio of L/D of about 3. The resulting slurry having a viscosity of about 10.7 as measured on a Bendix Corp. Model 1800 Viscometer was found to be sufficiently viscous to adequately suspend the carbon fiber after it was initially stirred. The slurry was degassed by pouring it into a container which was placed in a vacuum desiccator for a period of 3 minutes at a temperature of about 22° C. and a pressure of about 100 torr.

After the slurry had been sufficiently degassed, it was poured into a mold cavity all at once. Excess epoxy binder was removed by drawing the excess binder through the filter paper by application of a vacuum to achieve binder separation. As soon as the carbon filled cavity appeared to dry out, the upper section of the wax mold was released to allow it to press against the resulting cast carbon fiber preform.

The carbon fiber preform was then allowed to cure for a period of about 24 hours at room temperature. The cured preform was found to be strong and rigid. The bulk of the wax was removed by melting it in an oven. Residual amounts of wax were removed by packing the preform in activated charcoal and heating it in an oven at a temperature of about 100° C. for 200 minutes. The resulting preform was found to have a density of about 0.8.

A preform was then baked out in a nonoxidizing atmosphere at a pressure of about 1 torr to volatilize and pyrolyze the epoxy. Little dimensional change was found to take place during the bakeout.

In accordance with the procedure of copending application RD-10169, a charge of 3.1 parts of purified silicon powder was poured onto the preform which was 1 part, resulting in a weight ratio of about 3.1 of silicon powder to the preform. The preform was then placed in an oven in contact with the silicon powder and heated for 30 minutes at a temperature of 1450° C. to 1550° C. and a pressure of about 0.1 torr. There was obtained a silicon-silicon carbide composite refractory which was a duplicate of the original glass plate utilized in making the wax mold.

EXAMPLE 2

A carbon fiber slurry having a viscosity of 7.5 centipoises at 25° C. was prepared by mixing about equal parts by weight of carbon fiber and a liquid mixture of water, ethanol, and Elmer's glue, a product of the Borden Chemical Company. The water and ethanol were present at equal parts by weight in the liquid mixture and the white glue was present at 10% by weight of the water. The mixture of carbon fibers consisted of equal parts by weight of milled Union Carbide WDF felt described in Example 1 and VME fibers. The latter have a diameter varying from 5 to 50 microns and an aspect ratio L/D of from 3 to 100. The resulting slurry was degassed by pouring it into a container which was placed in a vacuum desiccator for a period of 3 minutes at a temperature of about 25° C. and a pressure of about 100 torr.

After the slurry was degassed sufficiently, it was poured into the mold cavity all at once which was similar to FIG. 1, but machined from Teflon resin. Excess binder was removed through the filter paper by application of vacuum to achieve binder separation. As soon as the carbon-filled cavity appeared to dry out, the inner mold section was removed. Drying was completed at 25° C. in 12 hours and the preform was separated from the outer mold halves.

The preform was packed into a powder mixture consisting of hexagonal boron nitride powder and silicon carbide powder, 10% boron nitride by weight. The flat base of the bowl faced upward and was not covered with the boron nitride-silicon carbide powder. A piece of boron nitride sprayed graffoil, with a ½ inch hole in the center to allow silicon to flow through, was placed above the exposed flat base to facilitate removal of excess silicon remaining in the crucible and attached to the infiltrated body after the furnace operation. A graphite crucible sprayed with boron nitride was placed over the flat bottom of the bowl and filled with silicon in excess of that required to react with the carbon and filled the remaining space. The preform assemblage was then placed into an oven and heated for 120 minutes at a temperature of 1460° to 1660° C. and a pressure of about 0.5 torr. After cool-down of the furnace, the body was removed from the powder and crucible. There was obtained a silicon-silicon carbide composite refractory.

The viscosities of the pourable mixtures of the above examples were determined with a Bendix Corp. Model 1800 Viscometer "Ultra-Visconson". Although these examples illustrate only a few of the very many variables which can be used in the practice of the present invention, it should be understood that the present invention is directed to a method for making a much broader variety of carbon fiber structures which can utilize various binders.

What we claim as new and desire to secure by Letters Patent of the United States is:

1. A method for making shaped carbon fiber structures which comprises
   (1) blending carbon fiber and curable binder to produce a stable pourable suspension,
   (2) degassing the suspension of (1) by use of reduced pressure,
   (3) pouring the degassed suspension into a mold,
   (4) stripping the suspension in the mold of excess binder, and (5) allowing or effecting the cure of the residual binder to produce a self-supporting shaped carbon fiber structure.

2. A method in accordance with claim 1, where the curable binder is an epoxy resin.

3. A method in accordance with claim 1, where the curable binder is a water soluble glue.

4. A method in accordance with claim 1, where the carbon fiber is milled felt.